Jan. 30, 1923.

H. SCHOENDELEN.
SAFETY DEVICE FOR PUNCH PRESSES AND THE LIKE.
FILED MAY 29, 1920.

H. SCHOENDELEN.
SAFETY DEVICE FOR PUNCH PRESSES AND THE LIKE.
FILED MAY 29, 1920.

Patented Jan. 30, 1923.

1,443,761

UNITED STATES PATENT OFFICE.

HUGO SCHOENDELEN, OF MAYWOOD, ILLINOIS, ASSIGNOR TO AMERICAN CAN COMPANY, OF NEW YORK, N. Y., A CORPORATION OF NEW JERSEY.

SAFETY DEVICE FOR PUNCH PRESSES AND THE LIKE.

Application filed May 29, 1920. Serial No. 385,203.

*To all whom it may concern:*

Be it known that I, HUGO SCHOENDELEN, a citizen of the United States, residing in Maywood, in the county of Cook and State of Illinois, have invented a new and useful Improvement in Safety Devices for Punch Presses and the like, of which the following is a specification.

This invention relates in general to feeding mechanism for punch presses and the like and has more particular reference to feeding mechanisms wherein a strip of sheet metal is fed into a punch press to have a number of articles formed therefrom by successive action of the die parts. It will, however, be manifest that with slight changes the invention may be used for feeding sheet metal to other forms of punch presses and to other types of machinery.

A principal object of the present invention is the provision of a feeding mechanism which may be provided in connection with a punch press to permit the punch press to act continuously and at a high rate of speed, arranging an article at each reciprocation of the active die.

Another object of the invention is the provision of means in such feeding mechanism for safe-guarding against possible introduction of more than a single strip into the active zone of the apparatus and to guard against introduction of sheet metal deformed or bent from usable shape.

The invention contemplates the provision of feed mechanism which will automatically lift the blanks singly from the stack exactly as they are required and deliver them automatically beneath the dies, the parts being so constructed and arranged that the strips may follow each other in such close sequence as to present a new strip for die action immediately following the completion of the articles from the next preceding strip.

Numerous other objects and advantages of the invention will be apparent as it is better understood from the following description, which taken in connection with the accompanying drawings discloses a preferred embodiment thereof.

For the purpose of illustrating my invention I have shown on the drawing a punch press for punching a number of can ends from a strip of material; the punch press apparatus including mechanism for advancing a strip from feeding position step by step to present successive portions of it to the operative parts of the press. This press, it is believed, need not be described completely in detail since the present invention relates to means for arranging the sheet in such feeding position together with the necessary attendant parts of the apparatus.

Figure 1:
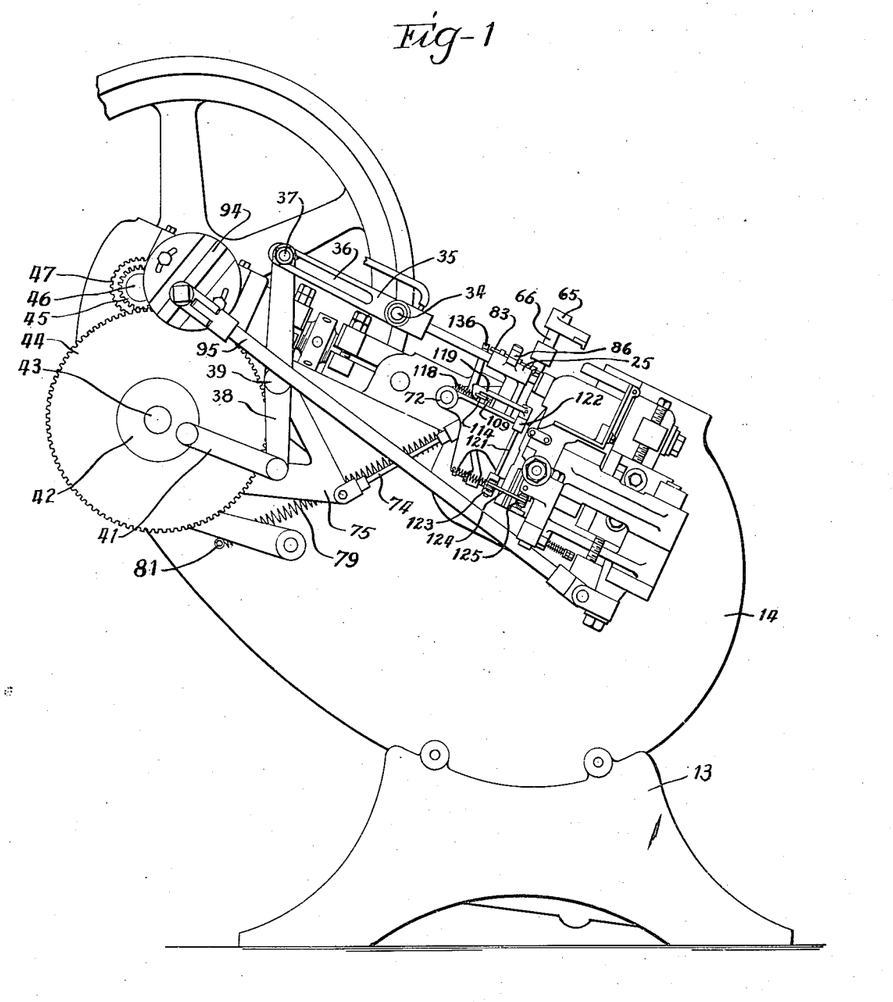
Figure 1 is an end elevation of an apparatus embodying my present invention.

The press shown on the drawing, however, comprises a base 13 providing a body 14, carrying the usual die press mechanisms which are driven from a pulley 15 upon the usual driving shaft. The feeding mechanism for successively arranging blanks into position for advancing beneath the die through the usual blank advancing means is disclosed as forming a part of this die press and is arranged at the left-hand side thereof, viewing Fig. 1.

The holder 16 for a stack of blanks is secured upon the bed and extends out to the left, and comprises a bottom 17, a front wall 18, an end wall 19 adjacent the dies 21 and 22, and an adjustable left-hand end 23. At the rear edge of the bottom 17 of the stack holder is provided a slot 24 in which it is desired to arrange the blanks successively in feeding position. The stack holder is inclined and the blanks rest on edges against the front wall. The action of the feeding mechanism is such as to move the upper or inmost member of the stack of blanks into registration with the slot 24 and then push it sidewise or edgewise positively into this slot. Means are included for preventing the further feeding of the apparatus should the blanks be bent from the flat form permitting them to enter into the slot; means are also provided for insuring stoppage of the machine should more than a single blank enter the slot and also means for stopping of the machine upon any jamming of the parts or other improper action. Means for lifting the blanks singly from the side of the stack adjacent the slot will first be described.

Three arms, indicated respectively by reference characters 25, 26 and 27, extend up from the support 28 for the stack holder and form bearings for axially reciprocating rods 31, 32 and 33 engaged at their rear ends to a cross bar 34 causing them to move in unison. This cross bar is connected to a slotted link 35, the slot 36 of which embraces a pin 37 upon a lever 38 pivoted at 39 on the body 14 of the press frame. The lever 38 is in turn eccentrically connected by a link 41 to a disk 42 on the stub shaft 43 having bearing in the body 14. This disk is provided with gear teeth 44 meshing with the gear 45 fixed on a stub shaft 46, which stub shaft is also provided with a gear 47 engaging a gear 48 on the main shaft 49 of the press so that rotation of the main shaft produces periodic reciprocation of the rods 31 to 33. The ratio of gearing is such that this reciprocation occurs but once for a number of revolutions of the main shaft equal to the number of stampings to be made from each blank.

Figures 10, 11:
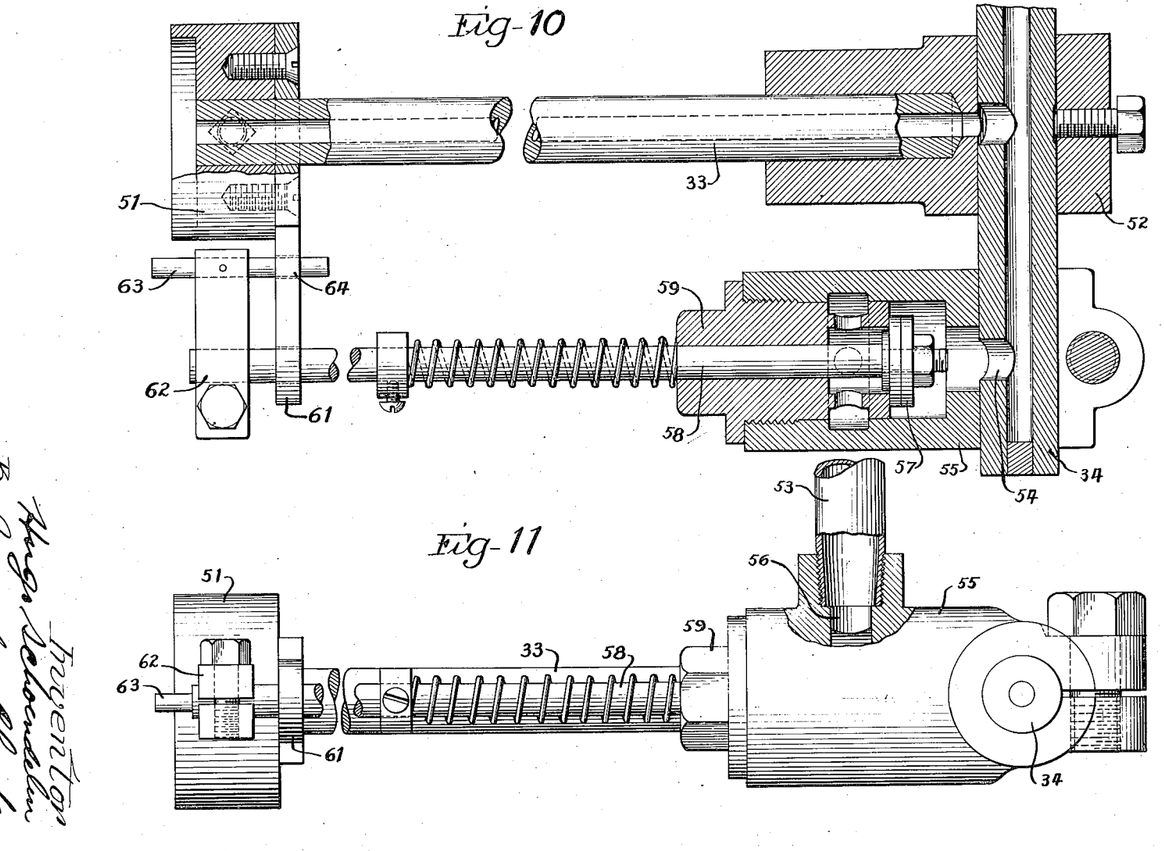
Fig. 10 is an enlarged detail section of a pneumatic lifting device.
Fig. 11 is a side elevation thereof.
Figure 12:
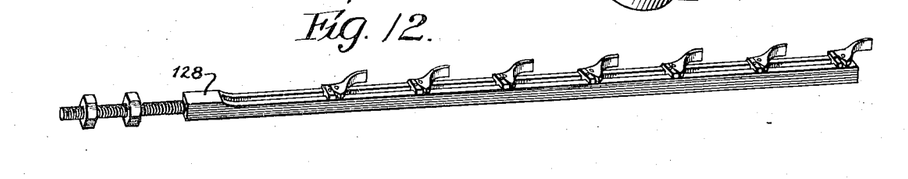
Fig. 12 is a perspective view of the feed bar.

Each rod 31 to 33 carries at its forward end a suction head 51 adapted to be brought by the reciprocation of the forward rod into contact with the adjacent blank of the stack. The rods 31 to 33, and cross connecting rod 34 are hollow or of pipe form and are connected together by couplings 52 so that communication may be established between the interior of the suction heads 51 and an air exhausting or vacuum conduit 53. The form of the rods in the suction head, together with the vacuum creating devices, is perhaps best shown in Figs. 10 and 11. As indicated in Fig. 10 the rod or pipe 34 extends through the coupling 52 of the pipe 33 and is provided with an opening 54 communicating with the interior of a valve chamber 55 having an inlet 56 from the conduit 53. Within this chamber is a valve 57 upon the end of a valve stem 58 extending down through a closure 59 for the valve chamber and through a bearing bracket 61 fast on the top of the adjacent head 51. The lower end of this valve stem is fixed to an arm 62 in which is rigidly positioned a pin 63 having bearing at 64 in the arm 61 extending out from the head. When the rods are moved into contact with the adjacent blank of the stack the pin 61 engages this blank and is pushed upwardly (viewing Fig. 10) lifting the valve and the suction device drawing the air through the three heads creates a holding suction for the blank when the heads are in contact with it. This arrangement provides for the utilization of the suction or vacuum creating means only when a blank is to be lifted and it will be apparent that should the blank be bent or twisted to a degree that will prevent it entering the slot in which it is to be subsequently placed the suction will be broken at one or the other of the three heads and these heads, being in communication with each other, all fail to have sustaining power for the blank so that it is not picked up and brought into accurate arrangement with the slot.

When, however, a blank of proper form is available it is carried by the suction heads on their return movement until it is accurately in registration with the slot 24, means being provided for moving it edgewise into the slot. These means comprise two pushers 65 mounted upon the ends of rods 66 that are adapted to reciprocate in bearings 67. The rear or lower ends of the rods 66 are connected by links 68 with arms 69 fast on cross shaft 71 pivotally mounted in bearing arms 72 extending out at the back of the support 28. The shaft 71 has an arm 73 connected by a link 74 with an arm 75 of a bell crank lever pivoted upon the stub shaft 39, the other arm 76 of which is provided with a roller 77 riding against the outer face of a cam 78 upon the shaft 43. This cam and lever link connection tends to move the pushers 65 to upper inoperative position and a heavy spring 79 fixed at one end at 81 to the body frame 14 of the press and at the other end to the pivot pin 82 connecting the link 73 with link 74 actuates the pushers in their pushing action.

Means are provided for preventing actuation of the pushers unless the blank is accurately supported at its two ends. At the inner front corners of the two outermost bearings 25 and 27 are provided slide rods 83 and 84 sliding in bearings 85 and the pushers are arranged between and closely adjacent these two outside heads. A lever or arm 86 is pivoted on each bearing 25 and 27 and in position to normally lie behind a block 87 on the rod 66 of the pusher. On each slide rod 83 and 84 is provided a collar 88. The slide rod is normally disposed so that its front end protrudes beyond the adjacent suction head and when a blank is moved by the suction heads the rod is slid rearwardly. The arrangement of the collar is such that it engages the lever and moves it from the path of the collar. If there be no blank present the levers remain in position behind the blocks 97 and prevent action of the pushers, and the same is true if either of the endmost suction heads fail to be engaged with the blank in the blank moving action. Where either or both levers 86 are restraining the action of the pushers the spring 79 fails to move the pushers as will be readily understood.

When, however, the pushers are moved they engage the upper edge of the blank and to this end a hardened steel member 89 is provided in the forward under edge of each pusher to engage over the blank and move it edgewise downwardly.

Figure 9:
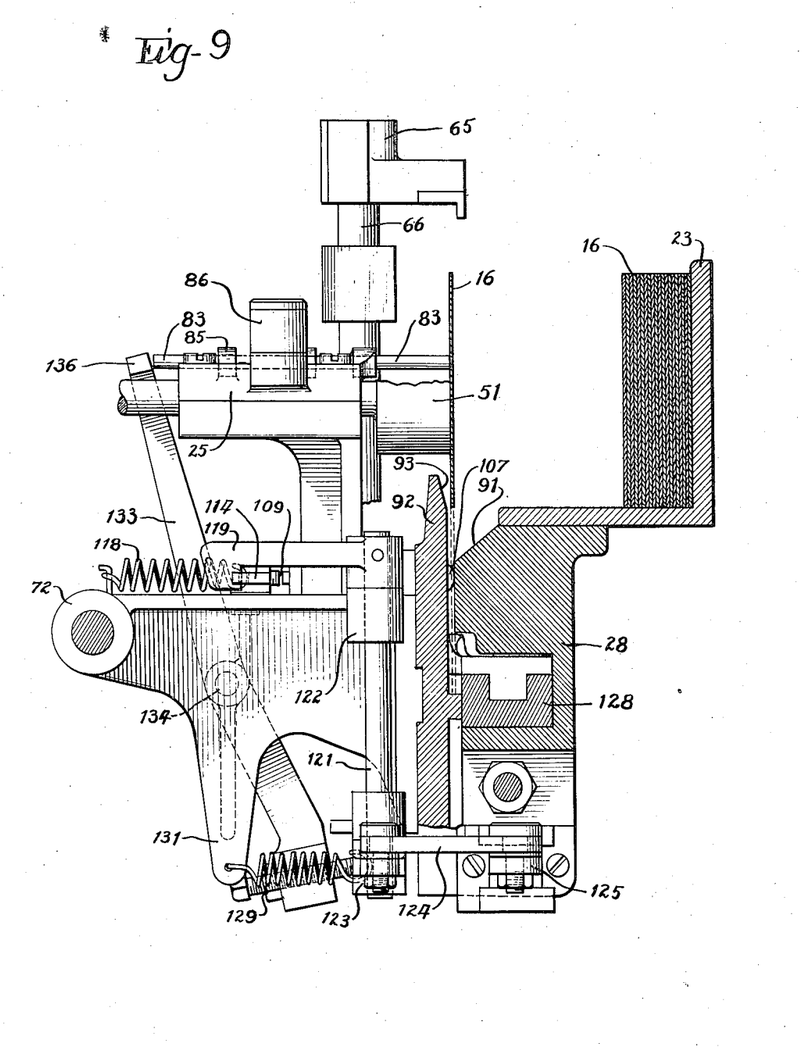
Fig. 9 is a vertical section through a portion of the apparatus as will be presently described.

Viewing Fig. 9 it will be noted that the material of the support 28 is cut away at 91 to provide a bevelled entrance to the slot and the plate 92 forming the back of the slot is bevelled slightly at its upper edge 93 to prevent scarring the tin of the blank in the movement inserting it into the slot.

Figure 2:
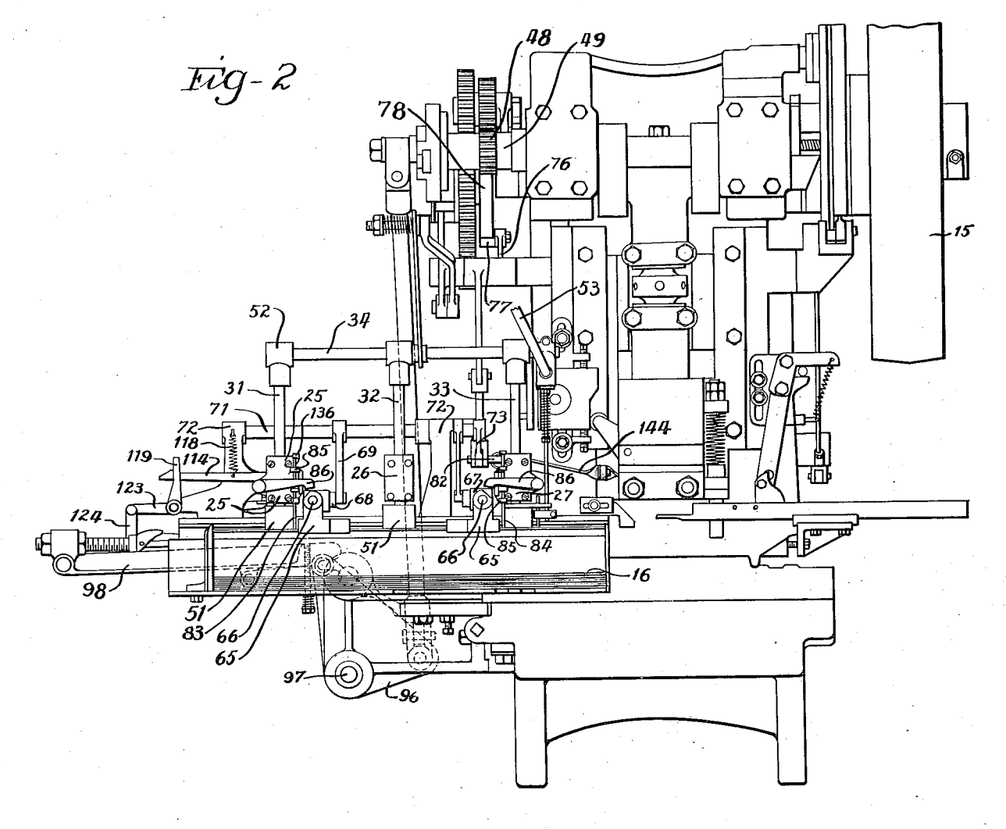
Fig. 2 is a top plan view thereof.
Figures 3, 13:
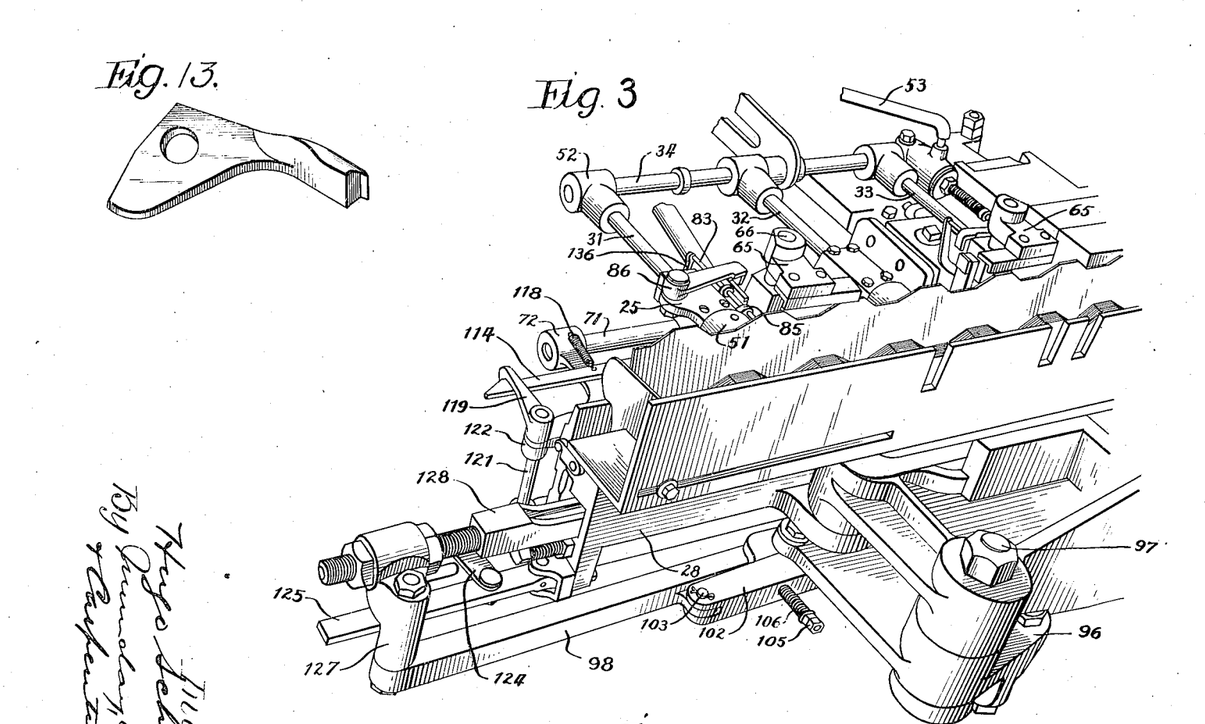
Fig. 3 is a perspective view of the left-hand portion of the feed apparatus looking from the front.
Fig. 13 is an enlarged perspective of a feed finger.
Figure 5:
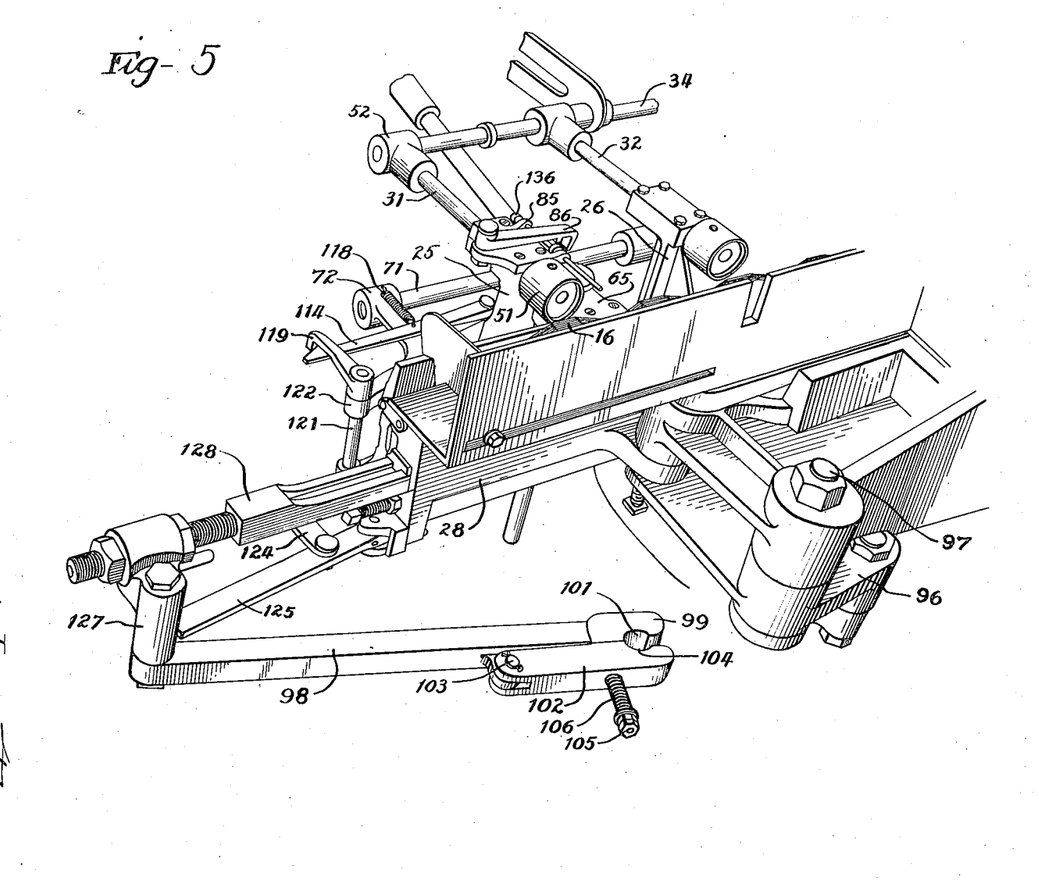
Fig. 5 is a perspective view similar to Fig. 3 and showing the parts in different relation.
Figures 6, 7:
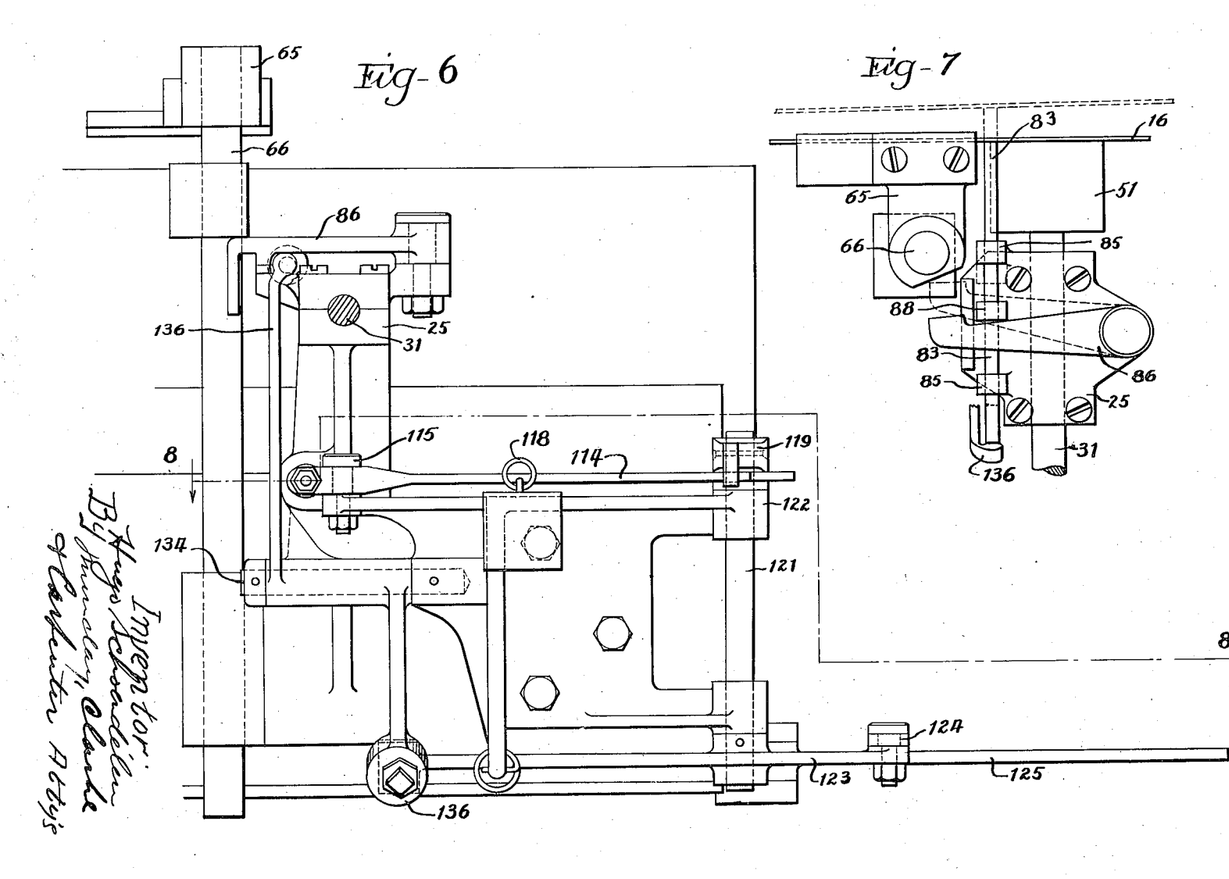
Fig. 6 is a partial plan view showing a number of the safety devices provided.
Fig. 7 is a plan detail of certain other safety devices.

Mechanism, as has been already stated, is provided for preventing feeding of the blanks should more than one of them be positioned in the slot at the same time. While the mechanism for advancing the blank along the slot and between the dies is not believed to require particular description, it perhaps should be mentioned that a crank disk 94 is provided upon the end of the main power shaft and this disk is connected by a connecting rod 95 with a bell crank lever 96 pivoted at 97 in the frame of the machine and engaging a link 98 which acts to advance the blanks along the slot. The connection between the link 98 and the bell crank lever 96 is perhaps best seen in Figs. 2 and 5 from which it will be noted that the end of the link connected with the bell crank is provided with a head 99 having an arcuate recess 101 in its side. This forms one of two jaws, the other of which is composed of a member 102 pivoted at 103 on the side of the arm and having a companion recess 104 adapted with the recess 101 to embrace the pivot pin connecting it with the bell crank. A bolt 105 is screwed at one end into the head 99 and extends through the member 102. This bolt is embraced by a spring 106 which normally holds the jaws in driving engagement about the pin. The arrangement, however, permits disconnection when resistance is offered to the pull of the link in the advancing action.

Figure 8:
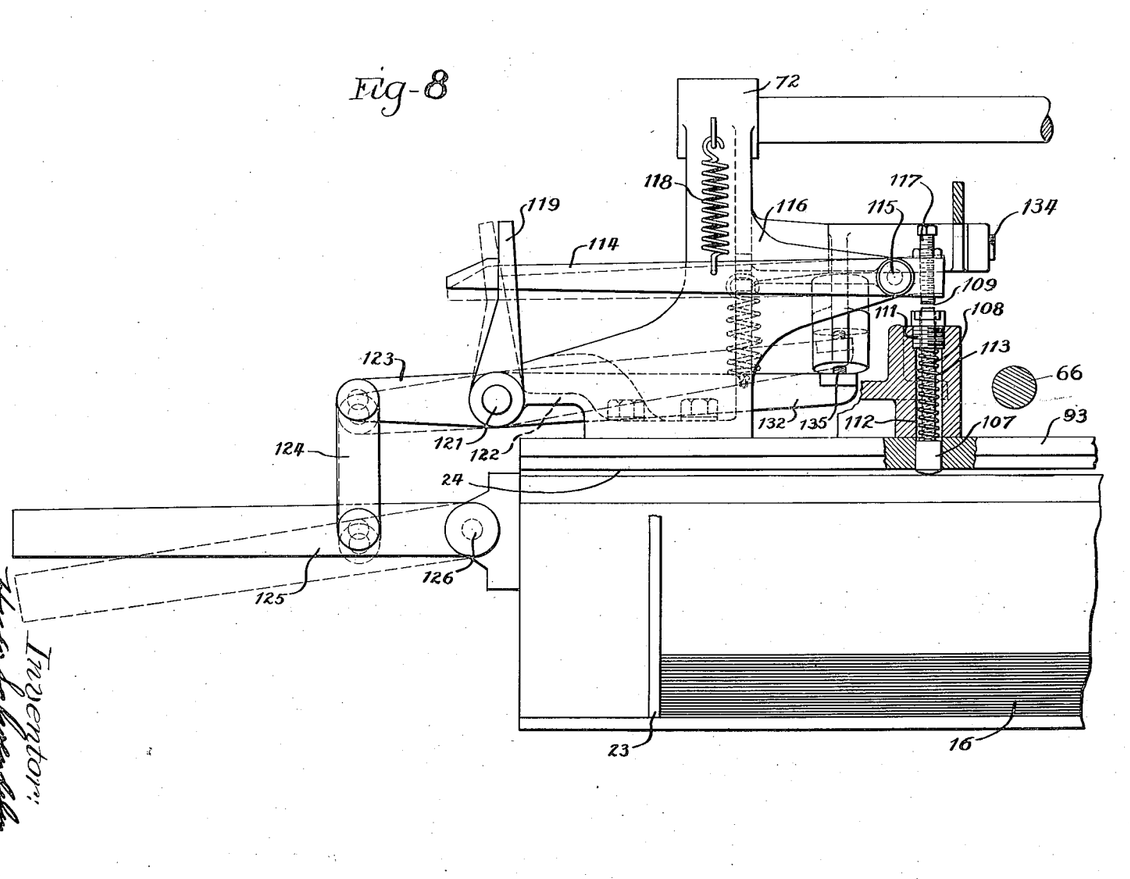
Fig. 8 is a section taken substantially on the line 8—8 of Fig. 6.

Referring now to Fig. 8, it will be noted that the material of the plate 93 is provided with an aperture 107 and in this aperture is mounted a spring pressed block 108 normally extending across the slot. This block has a stem 109 having a sliding bearing in a screw block 111 mounted in the end of a bore 112 immediately back of and in registration with the aperture 107. A spring 113 embraces the stem 109 of the block 108 and holds it normally extending across the recess. The forward end of the block is rounded and if two or more sheets are forced into the slot the block is pushed back so that it does not extend beyond the plane of the rear slot wall. A hook lever 114 pivoted at 115 on an arm 116 extending out from left-hand bearing 72 is provided at its right-hand end (viewing Fig. 8) with a set screw 117 adapted for engagement with the end of the block stem 109. When a single sheet is inserted in the slot the movement of the block is insufficient to cause it to engage with the set screw 117 but when two sheets are inserted engagement results and the hook lever is moved in a counter-clockwise direction and against a spring 118 provided to pull it in the reverse direction.

The hook lever engages beneath one arm 119 of a three arm lever pivoted at 121 on an arm 122 of the left-hand bearing 72. Another arm 123 of this three-arm lever is connected by a link 124 with an arm 125 pivoted at 126 on the end of the stack holder support 28. The arm 125 is normally disposed out of the path of movement of the pivotal connection 127 between the driving link 98 and the blank advancing slide 128. This feed bar has retractable fingers 130 that successively engage behind the blank to advance it.

When, however, the hook lever is released a spring 129 engaging an arm 131 of the left-hand bracket 72 and the third arm 132 of the three arm lever pulls the arm 125 over into the path of travel of the coupling 127 and causes the link 98 to disengage from the bell crank 96 with the resulting stoppage of the feed. This action is accompanied by interruption of the action of the suction heads. A lever 133 is pivoted upon a post or stud 134 extending out from the side of right-hand bearing 72. One arm of this lever engages the end 135 of arm 132 of the three arm lever already mentioned and the other arm of the lever extends up and has an end 136 disposed behind the rod 83, holding this rod in its normal advanced position and preventing any engagement of a blank by the suction head. Except when two blanks have thus stopped the feeding, the lever 133 rests out of the way by reason of the fact that the end having a set screw 129 is heavier than the end 136 and the lever is moved by gravity out of position for engagement with the rod 83.

Figure 4:
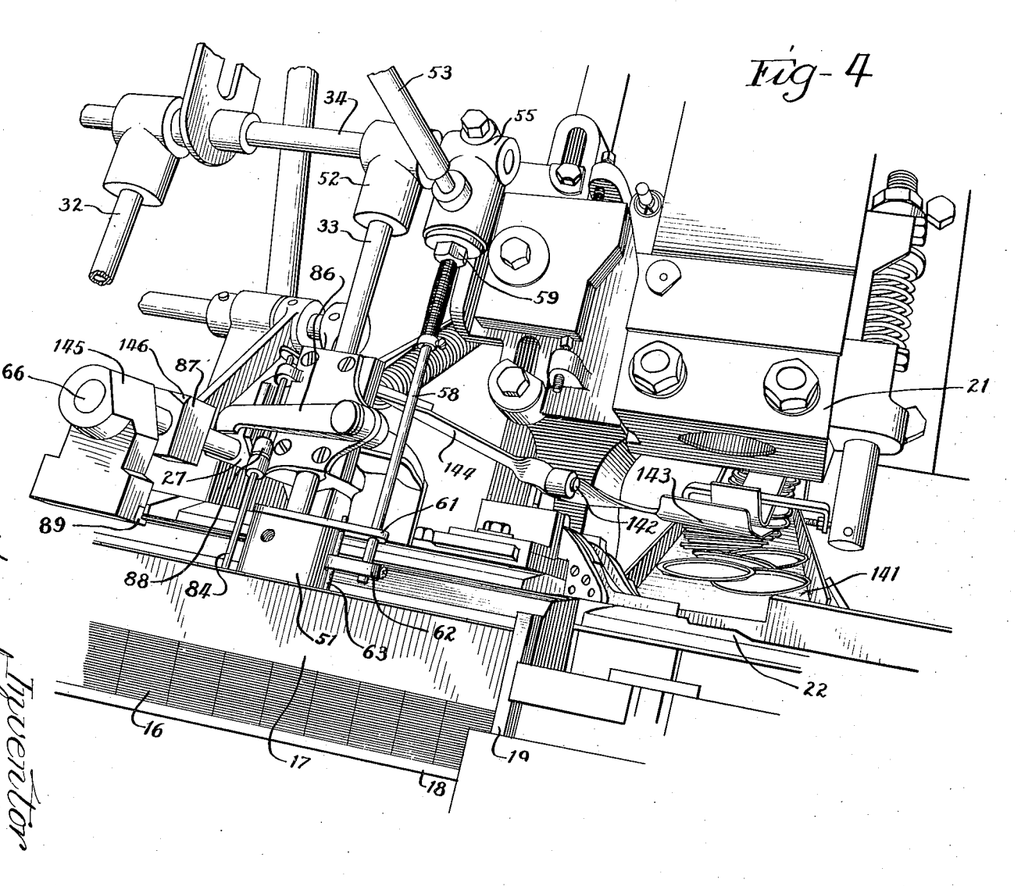
Fig. 4 is a perspective view of the right-hand portion thereof and showing the punching apparatus.

Means are also provided to prevent the feeding action of the articles, as for example can ends, accumulate in too great amount in the chute 141 leading from the dies, and this means comprises a lever pivoted at 142 and having one arm 143 bent out and curved (indicated in Fig. 4) and adapted to be lifted if the formed articles pile too high in the chute. The other arm 144 of this lever extends over above the rod 84 mounted in the bearing for the right-hand suction head rod. When the blanks pile up and the arm 144 is moved down the suction head is prevented from bringing a blank to the slot and the lever 86 is not raised to permit action of the pushers. After the pushers have pushed a blank into position the rods 83 and 84 move down again into advanced position permitting the levers to drop in behind the pushers. The forward adjacent edges of the pushers are bevelled at 145 as is also preferably the right corner of the blocks 87 at 146 to permit the ends of the levers to be lifted upon the return movement of the pushers.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

Claims:

1. In a feeding mechanism for die presses and the like, the combination of a stack holder, sheet-holding means for sheets taken from said stack holder, having a slot adapted to hold a plurality of sheets and extending downward below said stack holder, means for removing sheets from the stack holder to a point over said slot into which slot said sheets pass upon release from said removing means, a transverse pin extending into said slot, and engageable by a sheet therein, a feeding slide for propelling sheets successively out of said slot to be operated on by said press, and means whereby said pin controls the operation of the feeding slide and the operation of said removing means.

2. In a feeding mechanism for die presses and the like, the combination of a feed way, feeding means for advancing blanks deposited in said feed way, and means projectable in the path of said feeding means when more than a single blank is deposited in said feed way.

3. In a feeding mechanism for die presses and the like, the combination of a feed way, means for feeding blanks along said feed way, and means releasable through the presence of more than a single blank in said feed way and projectable across the path of travel of said feeding means.

4. In a feeding mechanism for die presses and the like, the combination of a feed way, a member normally disposed in said feed way and movable by a blank and in amount determined by the thickness of the blanks, feeding mechanism for feeding blanks along said feed way and a lock for said feeding mechanism, releasable by movement of said member and in amount greater than the thickness of the blank.

HUGO SCHOENDELEN.